United States Patent [19]

Nakagami et al.

[11] Patent Number: 5,694,317
[45] Date of Patent: Dec. 2, 1997

[54] BLADE CONTROL SYSTEM FOR A BULLDOZER

[75] Inventors: Hiroshi Nakagami; Shigenori Matsushita; Shigeru Yamamoto, all of Hirakata, Japan

[73] Assignee: Komatsu, Ltd., Tokyo, Japan

[21] Appl. No.: 609,135

[22] Filed: Feb. 29, 1996

Related U.S. Application Data

[62] Division of Ser. No. 129,080, filed as PCT/JP92/00457, Apr. 10, 1992, Pat. No. 5,621,643.

[30] Foreign Application Priority Data

Apr. 12, 1991 [JP] Japan .............................. HEI 3-108451

[51] Int. Cl.[6] .................. G06F 7/70; E02F 3/76; B60K 28/16
[52] U.S. Cl. ................ 364/424.07; 364/423.098; 364/426.019; 364/426.025; 172/4.5; 172/2; 172/3; 172/7; 414/699; 414/700; 180/197
[58] Field of Search ............. 364/424.07, 424.01, 364/423.098, 426.01, 426.015, 426.016, 426.019, 426.025, 426.027, 431.01; 172/3, 7, 4.5, 9, 815, 821, 826, 2, 811, 814, 827, 279; 73/493; 180/197, 170, 178, 6.2; 414/690, 273, 699, 700; 123/417, 352, 361

[56] References Cited

U.S. PATENT DOCUMENTS

| | | | |
|---|---|---|---|
| 3,711,971 | 1/1973 | Martin | 414/469 |
| 3,823,783 | 7/1974 | Luedtke | 172/815 |
| 3,939,919 | 2/1976 | Winker et al. | 172/826 |
| 4,053,018 | 10/1977 | Takeda | 172/4.5 |
| 4,157,118 | 6/1979 | Suganami et al. | 172/4.5 |
| 4,162,708 | 7/1979 | Johnson | 172/4.5 |
| 4,166,506 | 9/1979 | Tezuka et al. | 172/4.5 |
| 4,282,933 | 8/1981 | Suganami et al. | 172/4.5 |
| 4,423,785 | 1/1984 | Kurihara et al. | 172/3 |
| 4,630,685 | 12/1986 | Huck, Jr. et al. | 172/7 |
| 4,916,618 | 4/1990 | Stoltman | 180/197 |
| 5,219,411 | 6/1993 | Yamamoto et al. | 180/197 |
| 5,287,280 | 2/1994 | Yamamoto et al. | 364/424.07 |
| 5,293,944 | 3/1994 | Matsumoto | 172/2 |
| 5,297,649 | 3/1994 | Yamamoto et al. | 180/197 |
| 5,333,479 | 8/1994 | Yamamoto et al. | 172/3 |
| 5,621,643 | 4/1997 | Nakagami et al. | 364/424.07 |

FOREIGN PATENT DOCUMENTS

| | | |
|---|---|---|
| A-48-78702 | 10/1973 | Japan . |
| A-1-62525 | 3/1989 | Japan . |
| A-3-43523 | 2/1991 | Japan . |

*Primary Examiner*—Jacques Louis-Jacques
*Attorney, Agent, or Firm*—Armstrong, Westerman, Hattori, McLeland & Naughton

[57] ABSTRACT

A blade control system for a bulldozer, comprising: (a) a pitch angle detector for detecting a pitch angle of a vehicle body when the vehicle body inclines back and forth; (b) an actual tractive force detector for detecting an actual tractive force of the vehicle body; and (c) a controller for correcting the actual tractive force detected by the actual tractive force detector according to the pitch angle detected by the pitch angle detector and for controlling the blade to be lifted or lowered such that the corrected actual tractive force becomes equal to a target tractive force.

7 Claims, 12 Drawing Sheets

(W: TOTAL WEIGHT OF BULLDOZER 1)

BLADE CONTROL SYSTEM FOR A BULLDOZER

This is a divisional application of U.S. patent application Ser. No. 08/129,080, filed as PCT/JP00457, Apr. 10, 1992, now U.S. Pat. No. 5,621,643.

DISCLOSURE OF THE INVENTION

(1) Field of the Invention

The present invention relates to a blade control system for a bulldozer and, more particularly, to a control technique for keeping the load imposed on the blade constant, the load being caused by digging and carrying in dozing operation by a bulldozer.

(2) Description of the Prior Art

As one of control methods for keeping load imposed on the blade due to digging and carrying constant, we are contemplating the measure in which the actual tractive force of the vehicle body is detected and meanwhile, the blade is automatically lifted or lowered such that the detected actual tractive force becomes equal to a preset target tractive force which corresponds to the load imposed on the blade due to digging and carrying, whereby the load imposed on the blade due to digging and carrying can be kept constant.

SUMMARY OF THE INVENTION

There arises, however, the following problem in the above method in which the load on the blade caused by digging and carrying is kept constant by automatically lifting or lowering the blade such that a detected actual tractive force becomes equal to a target tractive force. That is, if the vehicle body is inclined, in other words, if running resistance is caused owing to the inclination angle of the land where the bulldozer runs, the running resistance affects the detected actual tractive force so that the load on the blade caused by digging and carrying cannot always be kept constant.

The invention has been made in order to overcome such a problem and therefore, one of the objects of the invention resides in the proposal of a blade control system for a bulldozer which is capable of invariably keeping the load imposed on the blade due to digging and carrying constant, even if running resistance occurs owing to the inclination angle of the land where the bulldozer runs.

The above object can be achieved by a blade control system for a bulldozer according to the invention, the system comprising:

(a) a pitch angle detecting means for detecting a pitch angle of a vehicle body when the vehicle body inclines back and forth;

(b) an actual tractive force detecting means for detecting an actual tractive force of the vehicle body; and (c) a controlling means for correcting the actual tractive force detected by the actual tractive force detecting means according to the pitch angle detected by the pitch angle detecting means and for controlling a blade to be lifted or lowered such that the corrected actual tractive force becomes equal to a target tractive force.

According to the system of the invention, the actual tractive force of the vehicle body which has been detected is corrected according to the detected pitch angle of the back-and-forth inclining vehicle body in order to eliminate running resistance caused by the pitch angle. Then, the blade is lifted or lowered such that the corrected actual tractive force becomes equal to a target tractive force that is preset, for example, by a dial switch or according to the corrected actual tractive force or the like. This enables it to invariably keep the load imposed on the blade caused by digging and carrying constant despite of the occurrence of running resistance due to the inclination angle of the land where the bulldozer runs.

The detection of actual tractive force by the actual tractive force detecting means is typically performed in one of the following methods.

1. An engine revolution sensor for detecting a revolution speed Ne of an engine and a torque convertor output shaft revolution sensor for detecting a revolution speed Nt of an output shaft of a torque convertor are employed. Speed ratio e (=Nt/Ne), which is a ratio of the engine revolution speed Ne detected by the engine revolution sensor to the torque convertor output shaft revolution speed Nt detected by the torque convertor output shaft revolution sensor, is first obtained. Then, a torque convertor output torque is obtained from a torque convertor characteristic of the torque convector, using the speed ratio e. The torque convertor output torque is then multiplied basically by a reduction ratio between the output shaft of the torque convertor and sprockets for driving crawler belts used for running the vehicle body. From this calculation, the actual tractive force of the vehicle body is obtained.

2. An engine revolution sensor, which detects a revolution speed of the engine when "lock-up" is selected in the torque convertor equipped with a lock-up mechanism or when a direct transmission is employed, is used. Engine torque is obtained from the engine torque characteristic of the engine, using the revolution speed of the engine detected by the engine revolution sensor. Then, the engine torque is multiplied basically by a reduction ratio between the engine and sprockets for driving crawler belts used for running the vehicle body, and accordingly, the actual tractive force of the vehicle body is detected.

3. A driving torque sensor, which detects an amount of driving torque from sprockets for driving crawler belts used for running the vehicle body, is employed. The actual tractive force of the vehicle body is detected based on the amount of driving torque detected by the driving torque sensor.

4. A bending stress sensor, which detects an amount of bending stress generated at trunnions that are joints between the vehicle body and straight frames for supporting the blade, is employed. The actual tractive force of the vehicle body is detected based on the amount of bending stress detected by the bending stress sensor.

The controlling means of the invention is made to perform the automatic driving control to keep the load on the blade caused by digging and carrying constant in the automatic driving mode on condition that a transmission is placed in first forward speed or intermediate forward speed and that the blade is not in manual operation. This arrangement makes it possible to perform automatic driving only when a speed suitable for dozing operation such as the first forward speed or intermediate forward speed is selected in the automatic driving mode. Manual operation of the blade is carried out in preference to the automatic driving operation and therefore can be arbitrarily inserted at any time, interrupting the automatic driving operation.

BRIEF DESCRIPTION OF DRAWINGS

FIGS. 1 to 11 are for explaining a blade control system for a bulldozer according to a preferred embodiment of the invention;

DESCRIPTION OF THE PREFERRED EMBODIMENTS

With reference to the drawings, a blade control system for a bulldozer according to a preferred embodiment of the invention will be hereinafter described.

Figure 1:
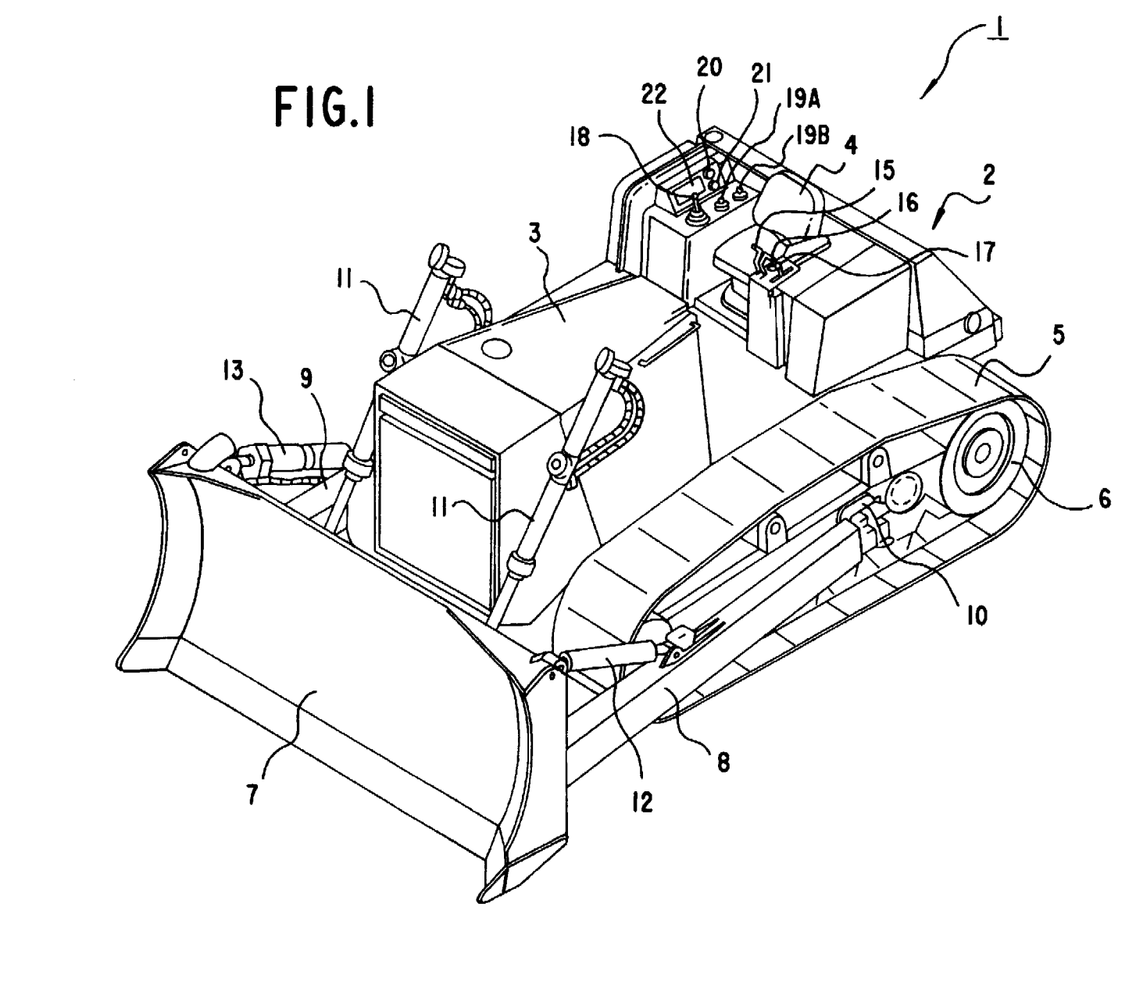
FIG. 1 is an external appearance of the bulldozer.

Referring to FIG. 1, there is shown an external appearance of a bulldozer 1 which is provided with, on a vehicle body 2 thereof, a bonnet 3 for housing an engine (not shown) and an operator seat 4 for the operator who drives the bulldozer 1. Both sides (i.e., the right and left sides when the vehicle body 2 is viewed in its moving direction) of the vehicle body 2 are provided with crawler belts 5 (the crawler belt on the right side is not shown) for running the vehicle body 2 so as to turn or move back and forth. These crawler belts 5 are independently driven by their respective corresponding sprockets 6 actuated by driving force transmitted from the engine.

There are provided straight frames 8, 9 for supporting a blade 7 at the forward ends thereof. The base ends of these right and left straight frames 8, 9 are pivotally supported at the right and left sides of the vehicle body 2 by trunnions 10 (the trunnion at the right side is not shown) in such a manner that the blade 7 can be lifted or lowered. Disposed between the blade 7 and the vehicle body 2 are right and left blade lift cylinders 11 forming a pair for lifting or lowering the blade 7. A brace 12 is disposed between the blade 7 and the left straight frame 8 and a blade tilt cylinder 13 is disposed between the blade 7 and the right straight frame 9. The brace 12 and the blade tilt cylinder 13 function to incline the blade 7 to the right and left.

There are provided a steering lever 15, a transmission shift lever 16 and a fuel control lever 17 on the left of the operator seat 4 when the vehicle body 2 is viewed in its moving direction. On the right of the operator seat 4, there are provided a blade control lever 18 for lifting, lowering the blade 7 and inclining it to the right and left; a first dial switch 19A for setting the magnitude of loads applied to the blade 7 by digging and carrying and a second dial switch 19B for compensating for the set magnitude of loads by addition or subtraction of a correction value; an automatic driving mode pressing selector switch 20 for switching ON/OFF of the automatic driving mode for dozing operation; a lock-up selector switch 21 for switching ON/OFF of the lock-up of a torque convertor; and a display unit 22. Although it is not shown in the drawing, there is provided a decelerator pedal in front of the operator seat 4.

Figure 2:
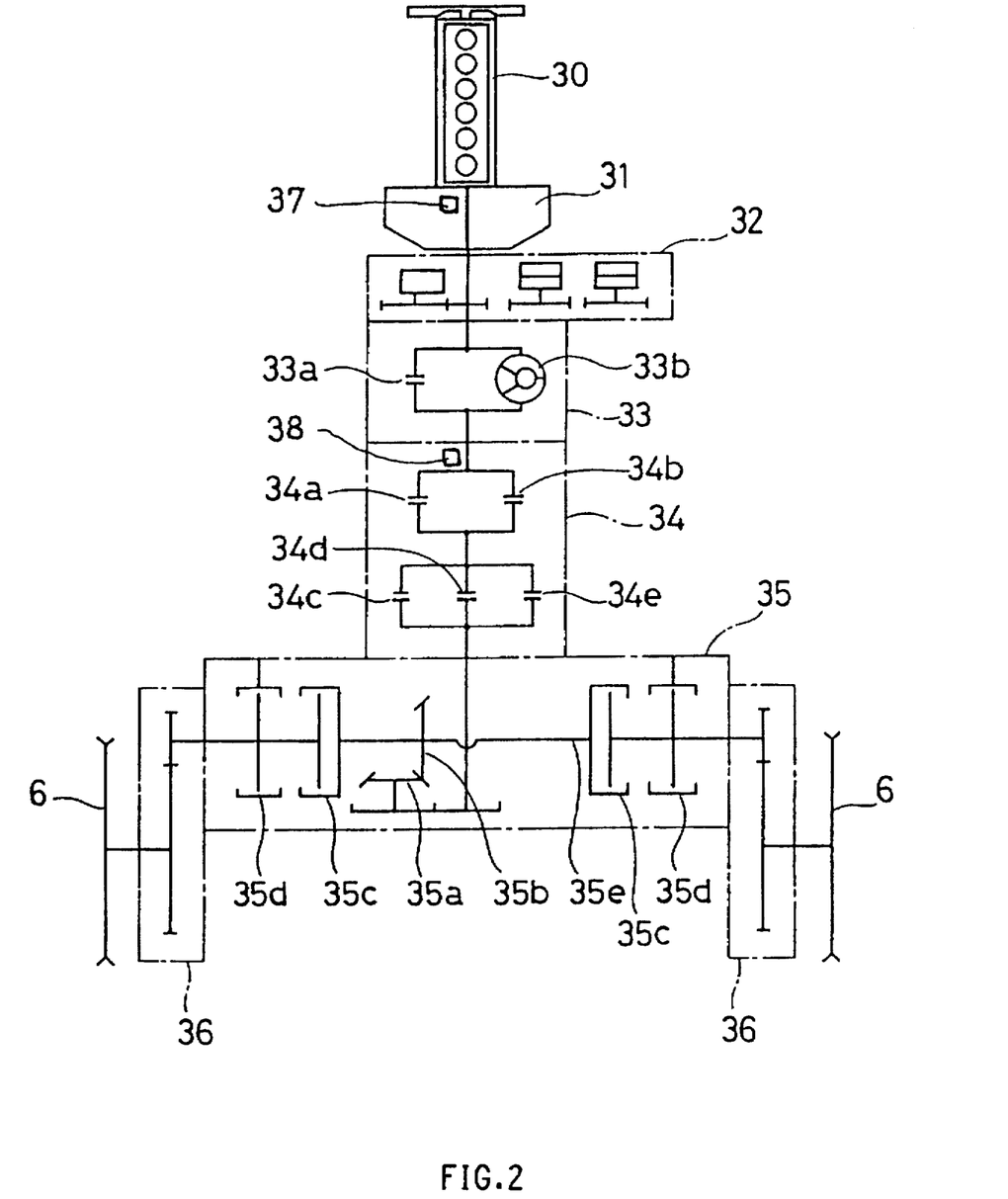
FIG. 2 is a skeleton diagram of a power transmission system.

Referring to FIG. 2 which shows a power transmission system, a rotary driving force from an engine 30 is transmitted to a torque convertor with a lock-up mechanism 33 through a damper 31 and a PTO 32. The torque convertor with a lock-up mechanism 33 includes a lock-up mechanism 33a and a pump 33b, and the PTO 32 functions to drive various hydraulic pumps including hydraulic pumps for operational machines. The rotary driving force is then transmitted from an output shaft of the torque convertor with a lock-up mechanism 33 to a transmission 34 such as e.g., a planetary gear lubricated multiple-disc clutch transmission, an input shaft of which is connected to the above output shaft. The transmission 34 includes forward and reverse clutches 34a, 34b and first to third clutches 34c to 34e so that the revolution of the output shaft of the transmission 34 can be shifted in three stages in both forward and backward directions. The rotary driving force from the output shaft of the transmission 34 is transmitted to a steering mechanism 35 that includes a transverse shaft 35e on which disposed are a pinion 35a, bevel gear 35b, right and left steering clutches 35c forming a pair, and right and left steering brakes 35d forming a pair. Thereafter, the rotary driving force is transmitted to a pair of final reduction mechanisms 36 disposed on the right and left hands so that each of the sprockets 6 for running the crawler belts 5 is driven. Note that Reference numeral 37 denotes an engine revolution sensor for detecting the revolution speed of the engine 30 and Reference numeral 38 denotes a torque convertor output shaft revolution sensor for detecting the revolution speed of the output shaft of the torque convertor with a lock-up mechanism 33.

Figure 3:
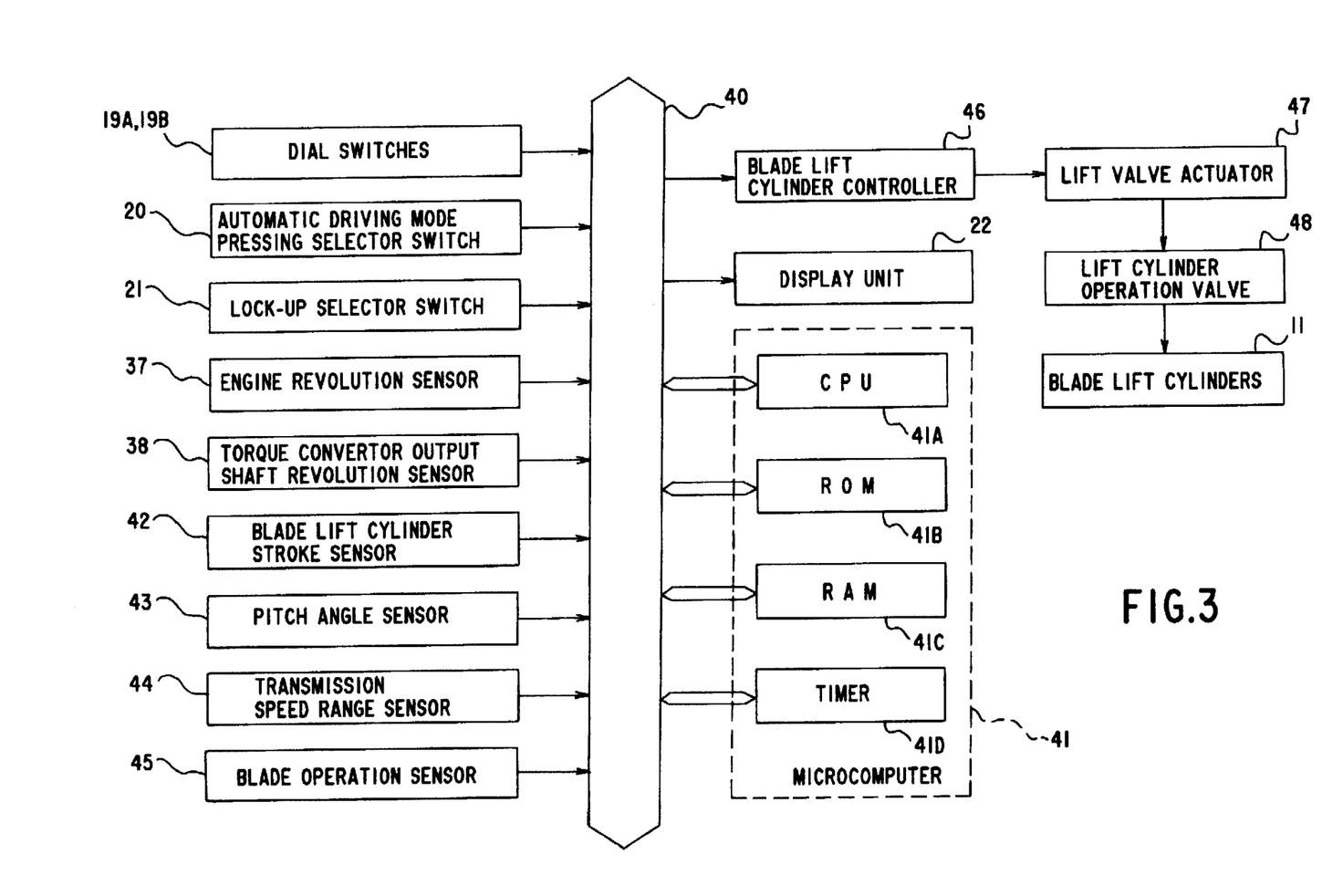
FIG. 3 is a schematic block diagram of an overall construction.

Referring to FIG. 3 which schematically shows the overall construction of the blade control system for a bulldozer of the invention, the following data items are supplied to a microcomputer 41 through a bus 40: (i) dial value data sent from the first dial switch 19A, for informing the magnitude of loads applied to the blade 7 by digging and carrying, the magnitude being set by the first dial switch 19A; (ii) dial value data sent from the second dial switch 19B, for informing a correction value to be added to or subtracted from the set value of the magnitude of loads; (iii) an automatic/manual driving mode instruction sent from the automatic driving mode pressing selector switch 20, for informing whether the automatic driving mode for dozing operation has been selected; (iv) a lock-up (L/U)/torque converting (T/C) instruction sent from the lock-up selector switch 21, for informing whether the lock-up of the torque convertor with a lock-up mechanism 33 has been selected; (v) revolution speed data sent from the engine revolution sensor 37, for informing the revolution speed of the engine 30; and (vi) revolution speed data sent from the torque convertor output shaft revolution sensor 38, for informing the revolution speed of the output shaft of the torque convertor with a lock-up mechanism 33. The following data are also supplied to the microcomputer 41 through the bus 40: (i) stroke positional data sent from a blade lift cylinder stroke sensor 42 that detects the respective stroke positions of the right and left blade lift cylinders 11 for lifting and lowering the blade 7; (ii) tilt angle data sent from a tilt angle sensor 43 that detects the varying tilt angle of the vehicle body 2 inclining back and forth in every movement; (iii) speed range data sent from a transmission speed range sensor 44 that detects a speed range condition of the transmission 34, more specifically, which of three speed ranges in forward and reverse has been selected by changing the gears through the operation of the transmission shift lever 16; and (iv) manual driving operation data from a blade operation sensor 45 that detects whether the blade 7 is set in manual driving operation carried out by the blade control lever 18.

The microcomputer 41 is composed of a central processing unit (CPU) 41A for executing a specified program; a read only memory (ROM) 41B for storing the above program and various maps such as a curved engine characteristic map and curved torque convertor characteristic map; a random access memory (RAM) 41C serving as a working memory necessary for executing the program and as registers for various data; and a timer 41D for measuring elapsed time for an event in the program. The program is executed in accordance with (i) the dial value data on the magnitude of loads applied to the blade 7 by digging and carrying; (ii) the dial value data on a correction value to be added to or subtracted from the value of the magnitude of loads; (iii) the automatic/manual driving mode instruction for dozing operation; (iv) the (L/U)/(T/C) instruction for the torque convertor with a lock-up mechanism 33; (v) the revolution speed data on the engine 30; and (vi) the revolution speed data on the output shaft of the torque convertor with a lock-up mechanism 33; (vii) the respective stroke positional data on the right and left blade lift cylinders 11; (viii) the pitch angle data on the vehicle body 2 inclining back and forth; (ix) the speed range data on the gear condition of the transmission 34; and (x) the manual driving operation data on the blade 7. Then, the amount of lift operation for lifting or lowering the blade 7 is supplied to a blade lift cylinder controller 46, and the right and left blade lift cylinders 11 are driven based on the lift operation amount by means of the controller 46 with the help of a lift valve actuator 47 and a lift cylinder operation valve 48, whereby the blade 7 is lifted or lowered. The display unit 22 displays such information as whether dozing operation by the bulldozer 1 is presently in the automatic driving mode or manual driving mode.

Figure 4A:
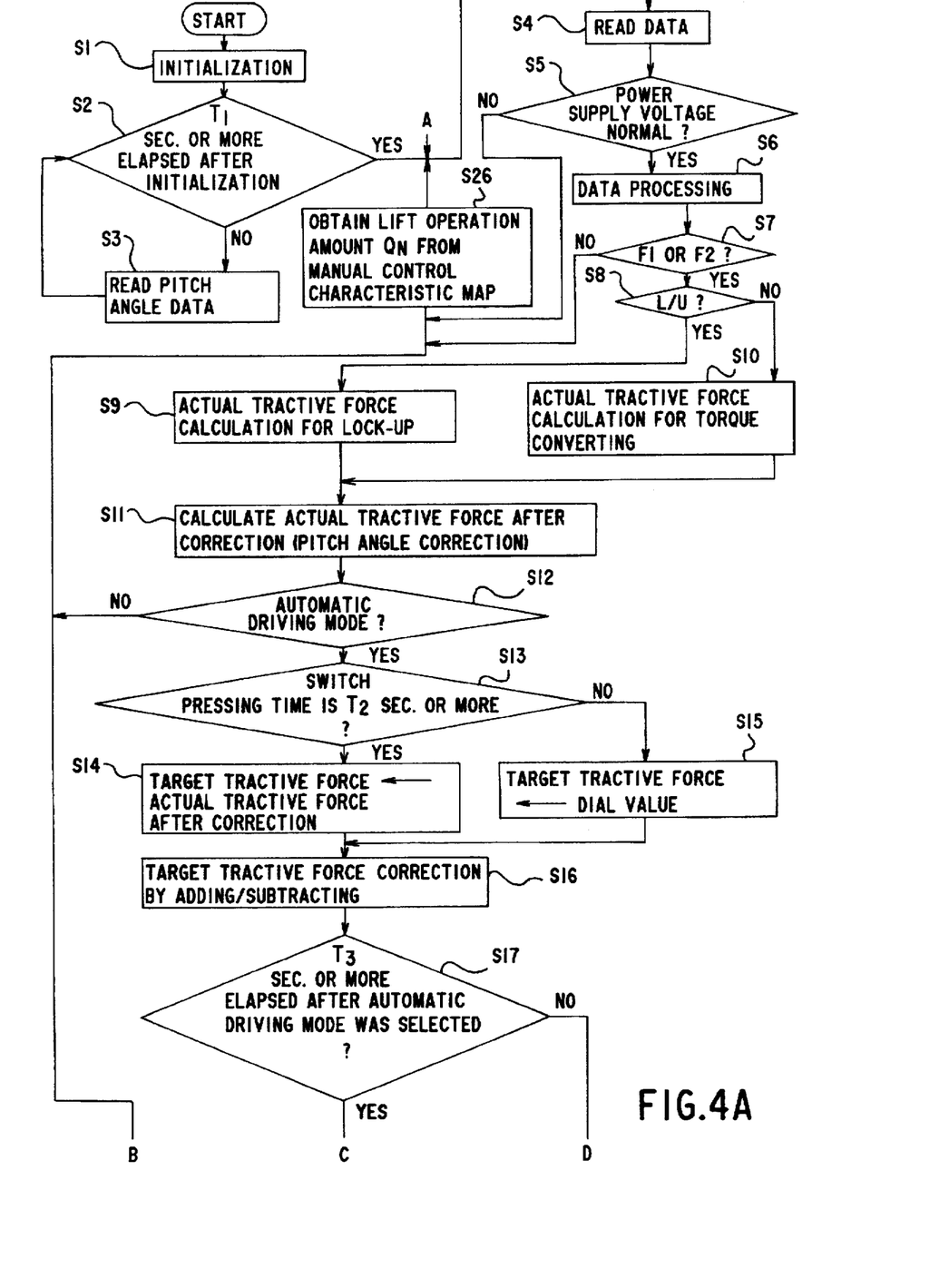
FIGS. 4A and 4B are flowcharts of a dozing program.
Figure 4B:
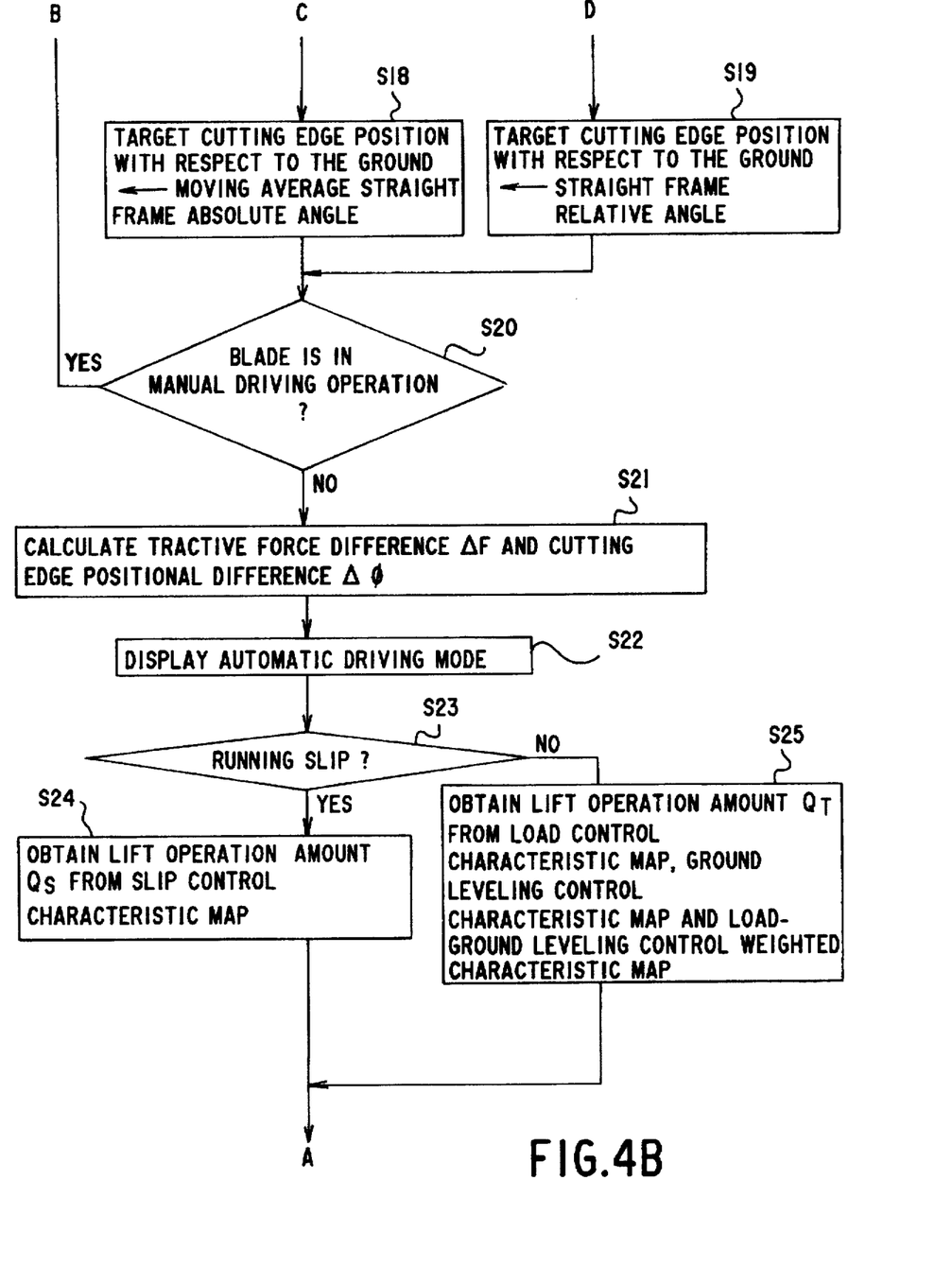

Now reference is made to the flowcharts of FIG. 4A and 4B for explaining, in detail, the performance of the blade control system for a bulldozer having the above-described arrangement.

Step 1 to Step 3: Power is loaded to start the execution of the specified program and initialization such as clearing all the data of the registers in the RAM 41C is executed. For $t_1$ seconds after the initialization, pitch angle data are sequentially read from the pitch angle sensor 43 as initial values. The reason why pitch angle data are sequentially read as initial values is that the pitch angle of the vehicle body 2 is obtained by frequency separation using the moving averages of the pitch angle data.

Step 4 to Step 6: The following data are firstly read. (i) the dial value data from the first dial switch 19A, for informing the magnitude of loads applied to the blade 7 by digging and carrying, the value of the magnitude being set by the first dial switch 19A; (ii) the dial value data from the second dial switch 19B, for informing a correction value to be added to or subtracted from the set value of the magnitude of loads; (iii) the automatic/manual driving mode instruction for dozing operation from the automatic driving mode pressing selector switch 20; (iv) the (L/U)/(T/C) instruction for the torque convertor with a lock-up mechanism 33 from the lock-up selector switch 21; (v) the revolution speed data from the engine revolution sensor 37, informing the revolution speed of the engine 30; and (vi) the revolution speed data from the torque convertor output shaft revolution sensor 38, informing the revolution speed of the output shaft of the torque convertor with a lock-up mechanism 33; (vii) the stroke positional data from the blade lift cylinder stroke sensor 42 for informing the respective stroke positions of the right and left blade lift cylinders 11; (viii) the pitch angle data from the pitch angle sensor 43 for informing the pitch angle of the vehicle body 2 inclining back and forth; (ix) the speed range data from the transmission speed range sensor 44, for informing the gear condition of the transmission 34; and (x) the manual driving operation data from the blade operation sensor 45, for informing whether the blade 7 is set in manual driving operation. Then, if the voltage of the power source is normal, i.e., more than a specified value and the electronic circuit is in a normal condition, the following data processing is executed.

1. Low frequency elements are derived from the sequentially read pitch angle data by frequency separation, utilizing the method of moving averages, whereby the pitch angle of the vehicle body 2 is obtained.

2. Then, acceleration elements are derived by frequency separation, specifically, by subtracting the above low frequency elements from the pitch angle data sequentially read, whereby the acceleration of the vehicle body 2 is obtained.

3. Based on data obtained by averaging the data on the respective stroke positions of the right and left blade lift cylinders 11, a straight frame relative angle $\phi_1$, which is the average of the angles of the right and left straight frames 8, 9 to the vehicle body 2, is obtained.

4. From the straight frame relative angle $\phi_1$ and the pitch angle of the vehicle body 2 thus obtained, a straight frame absolute angle, which is the average of the angles of the right and left straight frames 8, 9 to the ground, is obtained. Then, a moving average straight frame absolute angle $\phi_2$ is obtained by the method of moving averages in which the straight frame absolute angle which varies every moment is observed for 5 seconds.

Step 7 to Step 11: When the speed range condition (gear condition) of the transmission 34 is the first forward speed F1 or the second forward speed F2, an actual tractive force $F_R$ is calculated in either of the following methods selected depending on whether the (L/U)/(T/C) instruction for the torque converter with a lock-up mechanism 33 is "lock-up" or "torque converting".

1. "Lock-up"

Figure 5:
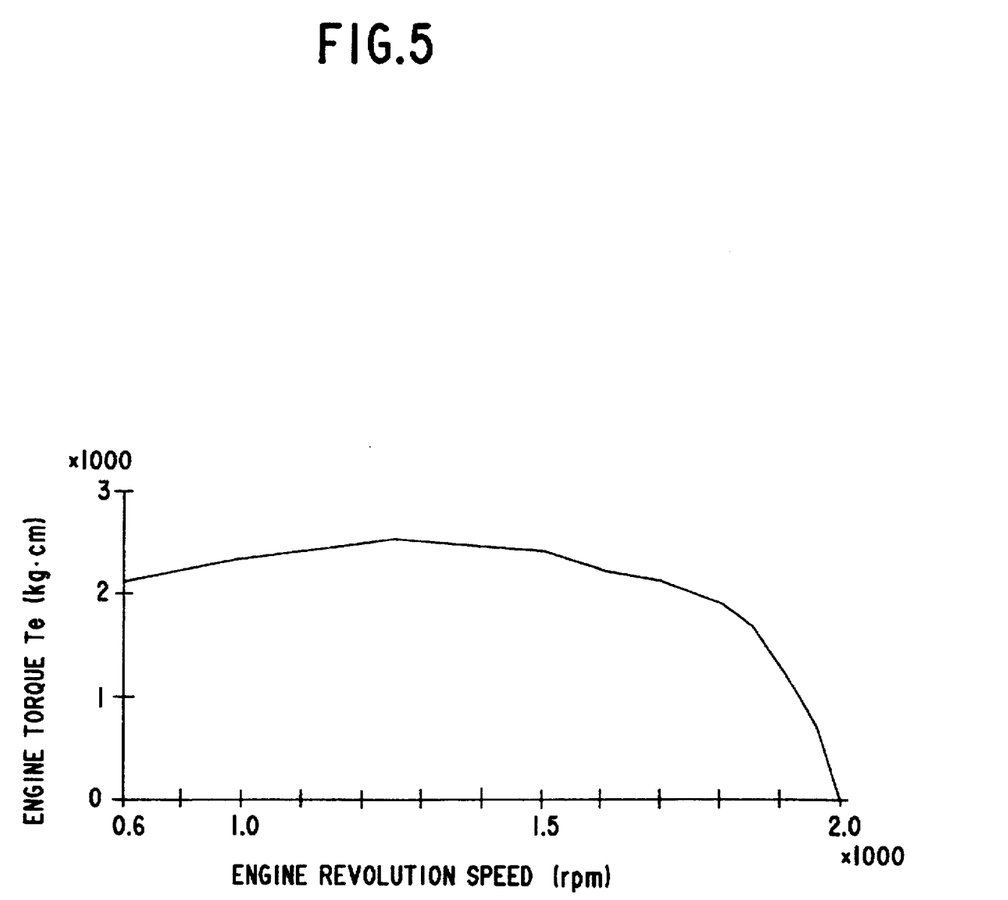
FIGS. 5 to 11 are a graph showing a curved engine characteristic map; graph showing a pump correction characteristic map; graph showing a curved torque converter characteristic map; graph showing a pitch angle-load correction value characteristic map; graph showing a load control characteristic map; graph showing a ground leveling control characteristic map; and graph showing a load-ground leveling control weighted characteristic map, respectively.
Figure 6:
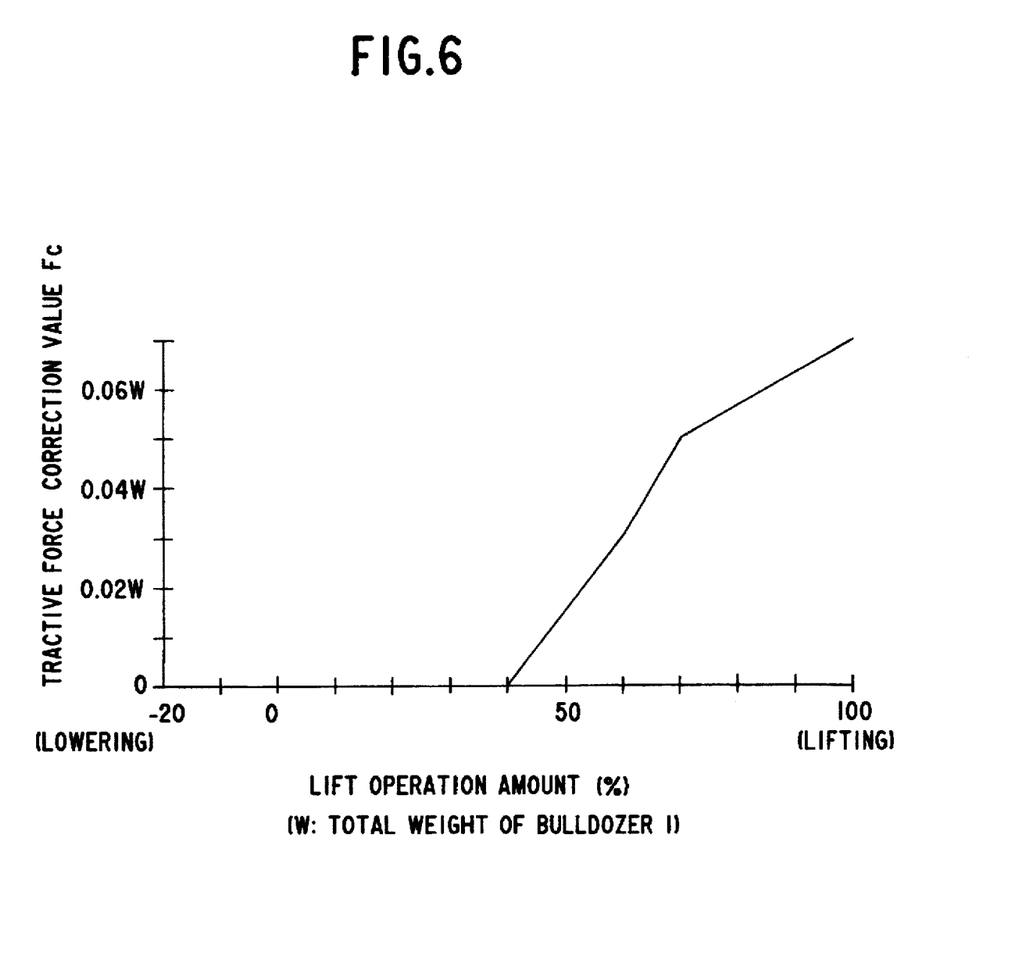

An engine torque Te is obtained from the curved engine characteristic map shown in FIG. 5, using the revolution speed Ne of the engine 30. Then, the engine torque Te is multiplied by a reduction ratio $k_{se}$ provided over the range of the transmission 34, the steering mechanism 35 and the final reduction mechanisms 36 (in other words, the reduction ratio $k_{se}$ between the output shaft of the torque convertor with a lock-up mechanism 33 and the sprockets 6) and further multiplied by the diameter r of the sprockets 6, to thereby obtain a tractive force Fe ($=Te \times k_{se} \times r$). A tractive force correction value Fc is subtracted from the tractive force Fe, thereby obtaining the actual tractive force $F_R$ (= Fe−Fc). The tractive force correction value Fc corresponds to the use of the hydraulic pumps for operational machines including the hydraulic pump working on the blade lift cylinders 11 in the PTO 32 and can be obtained from the pump correction characteristic map shown in FIG. 6, using the lift operation amount of the blade 7.

2. "Torque converting"

Figure 7:
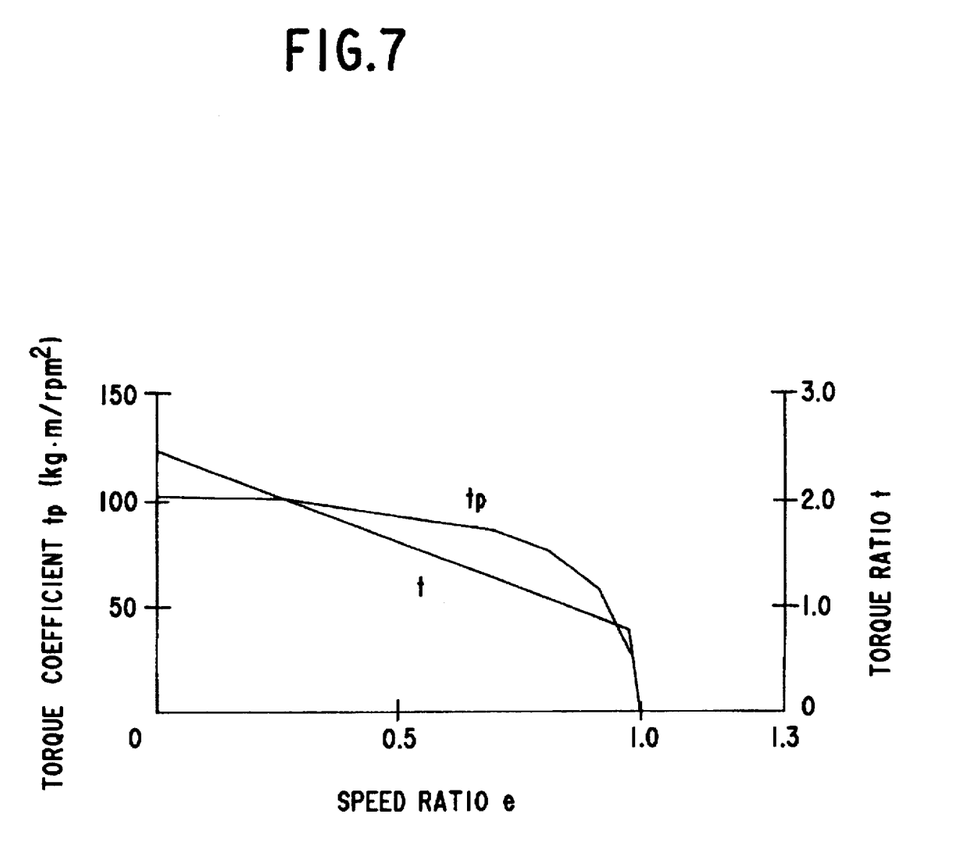

A torque coefficient $t_p$ and torque ratio t are obtained from the curved torque convertor characteristic map shown in FIG. 7, using the speed ratio e (=Nt/Ne) that is the ratio of the revolution speed Ne of the engine 30 to the revolution speed Nt of the output shaft of the torque convertor with a lock-up mechanism 33, and then a torque convertor output torque Tc ($=t_p \times (Ne/1000)^2 \times t$) is obtained. Similarly to the case 1, the torque convertor output torque Tc is multiplied by the reduction ratio $k_{se}$ between the output shaft of the torque convertor with a lock-up mechanism 33 and the sprockets 6 and further multiplied by the diameter r of the sprockets 6, to thereby obtain the actual tractive force $F_R (= Tc \times k_{se} \times r)$.

Figure 8:
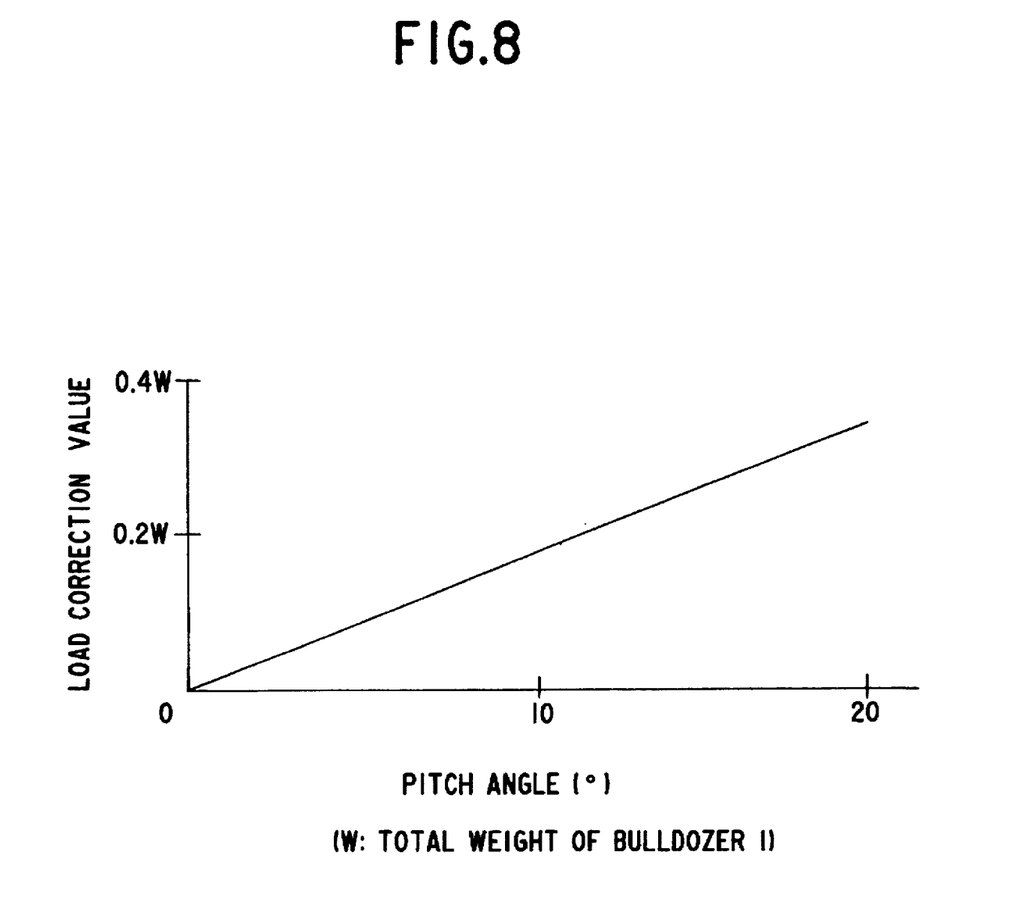

A load correction value which corresponds to the pitch angle of the vehicle body 2 and can be obtained from the pitch angle-load correction value characteristic map shown in FIG. 8, is subtracted from the actual tractive force $F_R$ thus obtained, thereby obtaining an actual tractive force after correction F.

Step 12 to Step 16: If the automatic/manual driving mode instruction for the automatic driving mode pressing selector switch 20 indicates the automatic driving mode of dozing operation, the following steps will be taken.

1. If a pressing time for operating the automatic driving mode pressing selector switch 20 is $t_2$ seconds or more, the actual tractive force after correction F is set as a target tractive force Fo.

2. If the pressing time for operating the automatic driving mode pressing selector switch 20 is less than $t_2$ seconds, a dial value set by the first dial switch 19A, corresponding to the magnitude of loads applied to the blade 7 by digging and carrying is set as the target tractive force Fo.

Then, the target tractive force Fo which has been set is corrected by adding or subtracting a dial value of the second dial switch 19B and is renewed, the dial value being a correction value for the magnitude of loads set by the first dial switch 19A.

Step 17 to Step 19: If the automatic/manual driving mode instruction for the automatic driving mode pressing selector switch 20 indicates the automatic driving mode of dozing operation and $t_3$ seconds or more have elapsed after the automatic driving mode was selected by the above instruction, the moving average straight frame absolute angle $\phi_2$ is set as a target cutting edge position $\phi_0$ with respect to the ground for the cutting edge of the blade 7. On the other hand, when less than $t_3$ seconds have elapsed, the straight frame relative angle $\phi_1$ is set as the target cutting edge position $\phi_0$ with respect to the ground for the cutting edge of the blade 7.

Step 20 to Step 22: When the dozing operation is not in the manual driving operation, that is, the blade 7 is not manually operated by the blade control lever 18, the tractive force difference ΔF between the target tractive force Fo and the actual tractive force after correction F as well as the positional difference Δφ between the target cutting edge position $\phi_0$ with respect to the ground and the moving average straight frame absolute angle $\phi_2$ are obtained. In the meantime, the display unit 22 indicates that the dozing operation is in the automatic driving mode.

Step 23 to Step 25: From moving average acceleration obtained by applying the method of moving averages to the acceleration of the vehicle body 2 which has been obtained from the acceleration elements derived from the pitch angle data by frequency separation and the actual tractive force after correction F, shoe slip (i.e., the running slip of the vehicle body 2) is detected as running slip. The detection is judged based on the following conditions.

1. If either of the following conditions is satisfied, the occurrence of running slip is admitted.
(1°=0.0174G, W: the total weight of the bulldozer 1)

(1) the moving average acceleration α<−4° or (2) the moving average acceleration α<−2° and the actual tractive force after correction F>0.6 W 2. If either of the following conditions is satisfied, it is admitted that after occurring, running slip has stopped.

(1) the moving average acceleration α>0.1° or (2) the actual tractive force after correction F>the actual tractive force after correction at the time of the start of running slip F−0.1 W After judging whether or not running slip has occurred based on the foregoing conditions, either of the following steps will be taken in accordance with the judgment.

1. If it is judged that running slip has occurred, a lift operation amount $Q_S$ for lifting the blade 7 is obtained from a slip control characteristic map (not shown)in order to eliminate the running slip by reducing loads applied to the blade 7 by digging and carrying.

2. If it is judged that no running slip has been detected, lift operation amounts $Q_1$ and $Q_2$ are obtained in the following ways.

Figure 9:
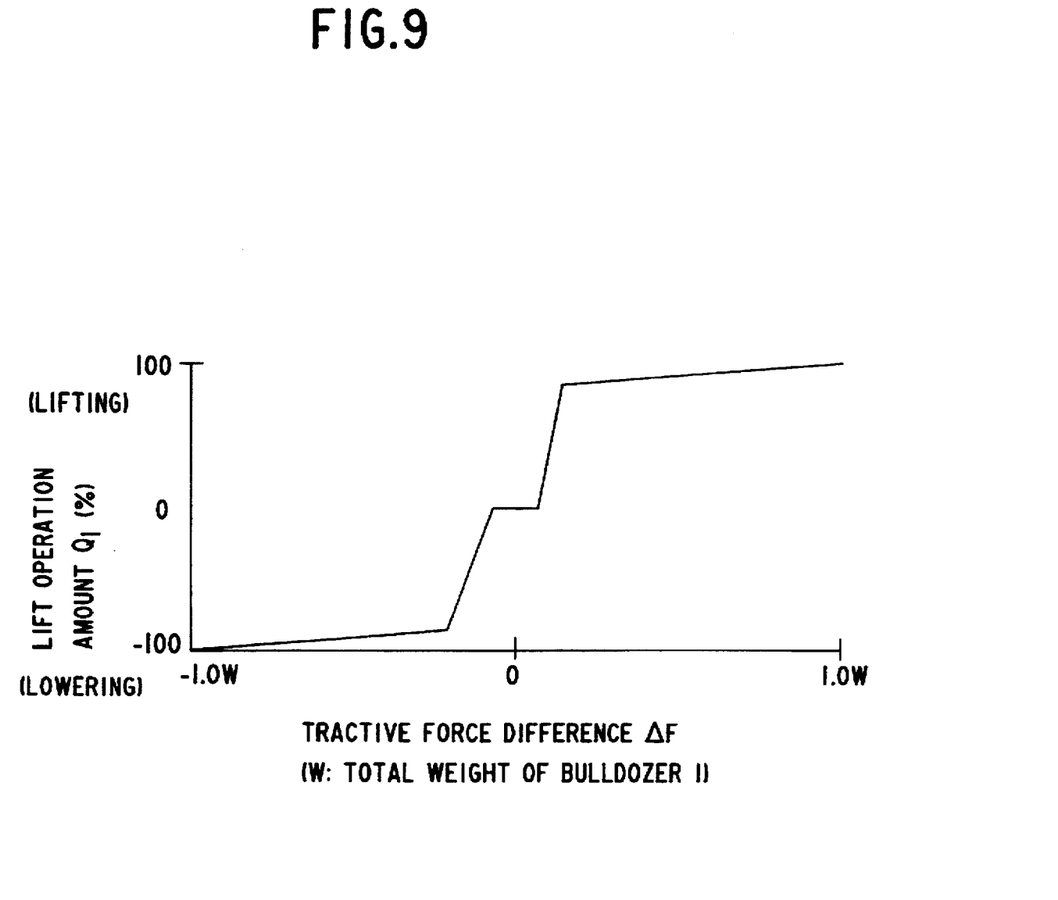

(1) Using the tractive force difference ΔF between the target tractive force Fo and the actual tractive force after correction F, the lifting amount $Q_1$ for lifting or lowering the blade 7 such that the actual tractive force after correction F becomes coincident with the target tractive force Fo is obtained from a load control characteristic map shown in FIG. 9.

Figure 10:
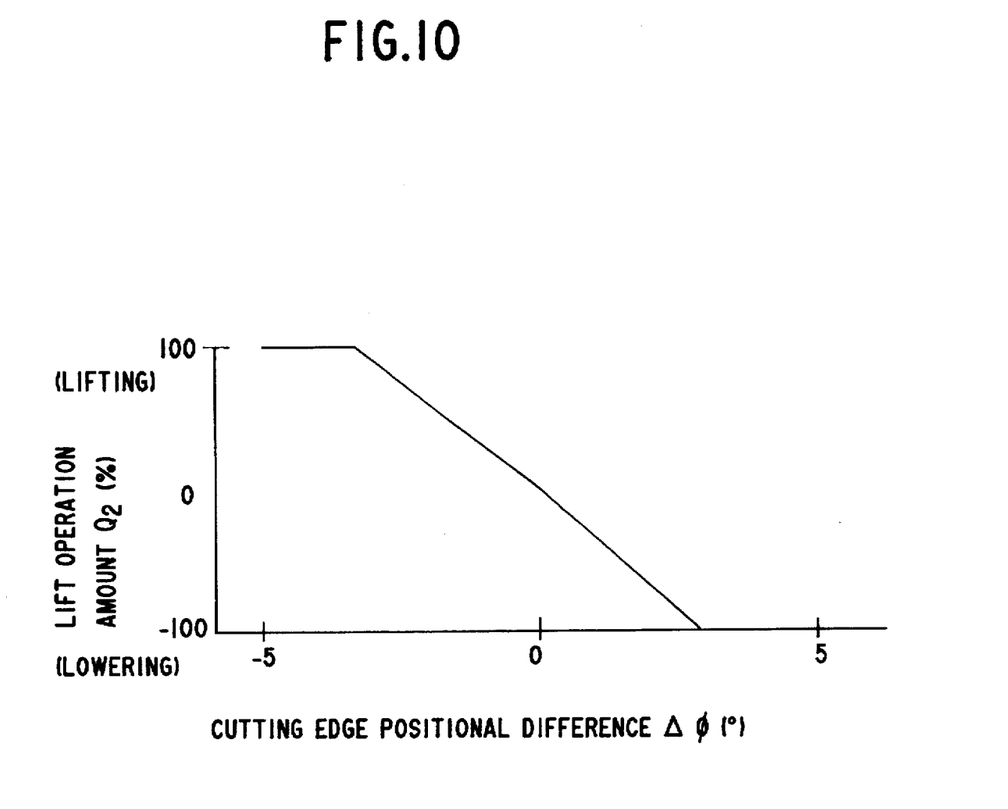

(2) Using the positional difference Δφ between the target cutting edge position with respect to the ground $\phi_0$ and the moving average straight frame absolute angle $\phi_2$, the lift operation amount $Q_2$ for lifting or lowering the blade 7 such that the moving average straight frame absolute angle $\phi_2$ becomes coincident with the target cutting edge position with respect to the ground $\phi_0$ from a ground leveling control characteristic map shown in FIG. 10.

Figure 11:
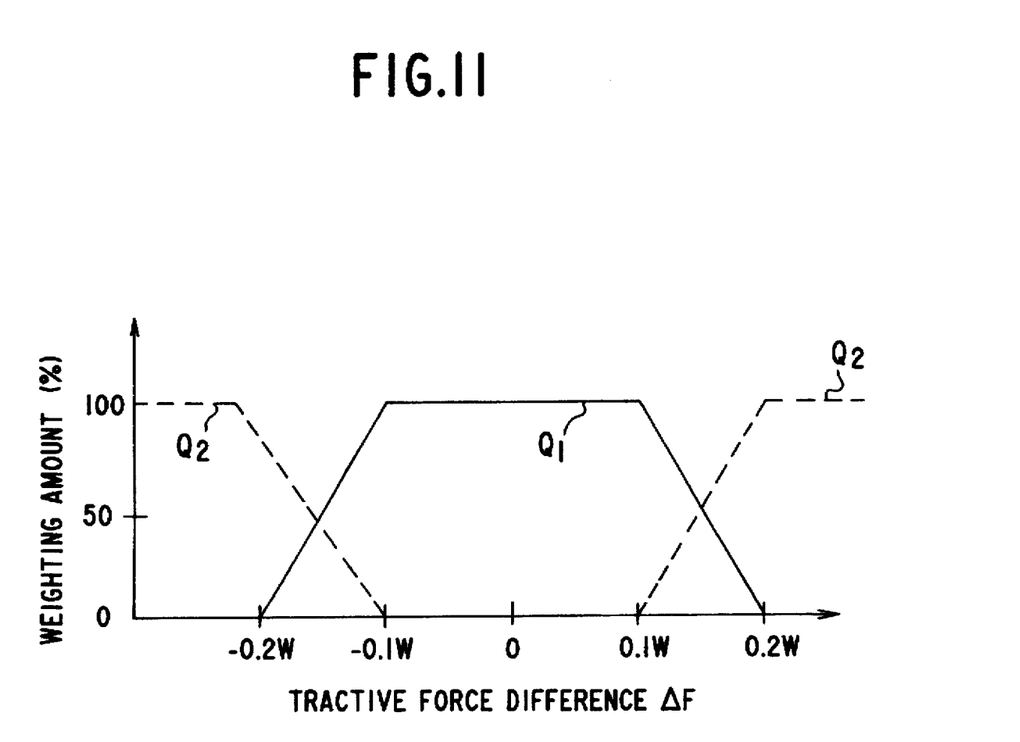

(3) Then, the lift operation amounts $Q_1$, $Q_2$ are weighted in accordance with a load-ground leveling control weighted characteristic map shown in FIG. 11, using the tractive force difference ΔF, whereby a lift operation amount $Q_T$ is obtained. According to the weighted map, when the tractive force difference ΔF is within the range of +0.1 W, the load control is performed in preference to the ground leveling control.

When the voltage of the power source is not normal, being less than the specified value and the electronic circuit functions abnormally; when the transmission 34 is in other speed range conditions (gear conditions) than the first forward speed F1 or the second forward speed F2; when the automatic/manual driving mode instruction for the automatic driving mode pressing selector switch 20 indicates the manual driving mode of dozing operation; or when the operation is the manual driving operation that the blade 7 is manually controlled with the blade control lever 18, a lift operation amount $Q_N$ for lifting or lowering the blade 7 is obtained from a manual control characteristic map (not shown), according to the operation amount of the blade control lever 18 in Step 26.

The above-mentioned lift operation amounts $Q_S$, $Q_T$ and $Q_N$ are supplied to the blade lift cylinder controller 46 which actuates the blade lift cylinders 11 through the lift valve actuator 47 and the lift cylinder operation valve 48 in accordance with the lift operation amounts $Q_S$, $Q_T$ and $Q_N$, thereby performing a desired control in lifting or lowering of the blade 7.

Although the actual tractive force is obtained by calculation in the foregoing embodiment, it could be obtained in other ways: for example, a driving torque sensor for detecting the driving torque of the sprockets 6 is employed and the actual tractive force is obtained based on the amount of driving torque detected by the driving torque sensor. Another alternative is that a bending stress sensor for detecting the amount of bending stress generated at the trunnions 10 by the straight frames 8, 9 for supporting the blade 7 is employed and the actual tractive force is obtained based on the amount of bending stress detected by the bending stress sensor.

In the foregoing embodiment, the invention has been particularly described with the power transmission system equipped with the torque convertor having a lock-up mechanism, but the invention is not necessarily limited to this as it may be applied to cases where a torque convertor having no lock-up mechanism or a direct transmission having no torque convertor is employed. When such a direct transmission is employed, the actual tractive force is calculated in the same way as described in the case of "lock-up" in the foregoing embodiment.

Further, in the embodiment, the running slip of the vehicle body 2 is detected by deriving acceleration elements from the pitch angle data output from the pitch angle sensor 43 by frequency separation, it may be detected from the output of an independent acceleration sensor, the output indicating the accelerated condition of the vehicle body 2. Alter-natively, a Doppler speed meter is employed and the running slip is detected by comparing the actual speed of the vehicle body 2 measured by the Doppler speed meter with the traveling speed of the crawler belts 5 for running the vehicle body 2.

Although the target cutting edge position with respect to the ground is set by calculation in the foregoing embodiment, it may be set by a dial switch similarly to the case of the target tractive force.

What is claimed is:

1. A blade control system for a bulldozer, comprising:
   (a) a pitch angle detecting means for detecting a pitch angle of a vehicle body when the vehicle body inclines back and forth;
   (b) an actual tractive force detecting means for detecting an actual tractive force of the vehicle body; and
   (c) a controlling means for correcting the actual tractive force detected by the actual tractive force detecting means according to the pitch angle detected by the pitch angle detecting means and for controlling a blade to be lifted or lowered such that the corrected actual tractive force becomes equal to a target tractive force, the corrected actual tractive force eliminating any running resistance caused by the pitch angle detected by the pitch angle detecting means which exists upon an inclining back and forth of the vehicle body wherein the blade lifting/lowering control by the controlling means is performed in the automatic driving mode on condition that a transmission is placed in first forward speed or intermediate forward speed and the blade is not in manual operation.

2. The blade control system for a bulldozer as claimed in claim 1, wherein the pitch angle detecting means performs pitch angle detection by extracting low-frequency components by frequency separation using a moving average of the pitch angle of the vehicle body, the pitch angle varying as the vehicle body inclines back and forth.

3. The blade control system for a bulldozer as claimed in claim 1, wherein the actual tractive force detecting means comprises an engine revolution sensor for detecting a revolution speed Ne of an engine and a torque convertor output shaft revolution sensor for detecting a revolution speed Nt of an output shaft of a torque convertor, and wherein the actual tractive force detecting means detects the actual tractive force of the vehicle body in such a way that speed ratio e (=Nt/Ne) which is a ratio of the engine revolution speed Ne detected by the engine revolution sensor to the torque convertor output shaft revolution speed Nt detected by the torque convertor output shaft revolution sensor, is obtained; an torque convertor output torque is obtained from a torque convertor characteristic of the torque convertor, using the speed ratio e; and the torque convertor output torque is multiplied basically by a reduction ratio between the output shaft of the torque convertor and sprockets for driving crawler belts used for running the vehicle body.

4. The blade control system for a bulldozer as claimed in claim 1, wherein the actual tractive force detecting means comprises an engine revolution sensor, which detects a revolution speed of an engine when a lock-up mode is selected in a torque convertor equipped with a lock-up mechanism or when a direct transmission is employed, and wherein the actual tractive force detecting means detects the actual tractive force of the vehicle body in such a way that engine torque is obtained from an engine torque characteristic of the engine, using the revolution speed of the engine detected by the engine revolution sensor; and then, the engine torque is multiplied basically by a reduction ratio between the engine and sprockets for driving crawler belts used for running the vehicle body.

5. The blade control system for a bulldozer as claimed in claim 1, wherein the actual tractive force detecting means comprises a driving torque sensor which detects an amount of driving torque from sprockets for driving crawler belts used for running the vehicle body, and wherein the actual tractive force detecting means detects the actual tractive force of the vehicle body based on the amount of driving torque detected by the driving torque sensor.

6. The blade control system for a bulldozer as claimed in claim 1, wherein the actual tractive force detecting means comprises a bending stress sensor which detects an amount of bending stress generated at trunnions that are joints between the vehicle body and straight frames for supporting the blade, and wherein the actual tractive force detecting means detects the actual tractive force of the vehicle body based on the amount of bending stress detected by the bending stress sensor.

7. The blade control system for a bulldozer as claimed in claim 1, wherein the target tractive force is set by a dial switch or based on the corrected actual tractive force.

* * * * *